United States Patent
Zwarts et al.

(10) Patent No.: US 10,986,835 B2
(45) Date of Patent: Apr. 27, 2021

(54) **USE OF 9-TRICOSENE TO CONTROL *DROSOPHILA SUZUKII***

(71) Applicants: Globachem NV, Sint-Truiden (BE); VIB VZW, Ghent (BE)

(72) Inventors: Liesbeth Marie Renee Zwarts, Pellenberg (BE); Yannick Maria Snellings, Heverlee (BE); Patrick Frans Karel Callaerts, Scherpenheuvel-Zichem (BE); Lieven Denruyter, Sint-Truiden (BE)

(73) Assignees: Globachem NV, Sint-Truiden (BE); VIB VZW, Ghent (BE)

( * ) Notice: Subject to any disclaimer, the term of this patent is extended or adjusted under 35 U.S.C. 154(b) by 352 days.

(21) Appl. No.: 16/303,750

(22) PCT Filed: May 24, 2017

(86) PCT No.: PCT/EP2017/062673
§ 371 (c)(1),
(2) Date: Nov. 21, 2018

(87) PCT Pub. No.: WO2017/207408
PCT Pub. Date: Dec. 7, 2017

(65) Prior Publication Data
US 2020/0315170 A1   Oct. 8, 2020

(30) Foreign Application Priority Data
May 30, 2016   (BE) .................................. 2016/5397

(51) Int. Cl.
*A01N 27/00*   (2006.01)

(52) U.S. Cl.
CPC .................................. *A01N 27/00* (2013.01)

(58) Field of Classification Search
CPC .................................................... A01N 27/00
See application file for complete search history.

(56) References Cited

U.S. PATENT DOCUMENTS

2015/0366194 A1   12/2015   Escaich Ferrer et al.

FOREIGN PATENT DOCUMENTS

CN   101785486 A   7/2010

OTHER PUBLICATIONS

Dalia La-France et al., "Biological activity of synthetic hydrocarbon mixtures of cuticular components of the female housefly (*Musca dometica* L.)," Journal of Chemical Ecology, vol. 15, No. 5, May 1, 1989, pp. 1475-1490.
Amy C. Murillo et al., "Laboratory and field assessment of cyantraniliprole relative to existing fly baits: Evaluation of toxic fly baits," Pest Management Science, vol. 71, No. 5, Jul. 15, 2014, pp. 752-758.
Extended European Search Report dated Jun. 25, 2020 in related European Application No. EP 20175281.3.
Examination Report dated Mar. 2, 2020 in related Indian Application No. 201817048381.
Lin et al., "Food odors trigger *Drosophila* males to deposit a pheromone that guides aggregation and female oviposition decisions", eLIFE, vol. 4, 30, Sep. 30, 2015, pp. 1-26.
Valerie Mazzoni, et. al., Substrate Vibrations during Courtship in Three *Drosophila* species, Nov. 15, 2013, vol. 8, issue 11, Plos One, San Michele all'Adige, Italy.
Dekker et al., "Loss of *Dorsophila* pheromone reverses its role in sexual communication *Drosophila suzukii*", Proceedings Royal Society Biological Sciences Ser. B, vol. 282, Feb. 2015, pp. 1-9.
Hamby et al., "Biotic and abiotic factors impacting development, behavior, phenology, and reproductive biology of *Dorsophila suzukii*", Journal of Pest Science, Springer Berlin, Heidelberg, vol. 89, No. 3, Apr. 2016, pp. 605-619.
Dweck et al., "Olfactory channels associated with the *Drosophila* maxillary palp mediate short—and long-range attraction", eLIFE, vol. 5, May 2016, pp. 1-19.
Erland et al., "Insecticidal and oviposition deterrent effects of essential oils and their constituents against the invasive pets *Drosophila suzukii* (Matsumura) (Diptera; Drosophilidae)", Crop Protection, vol. 78, Aug. 2015, pp. 20-26.
International Search Report and Written Opinion, completed Jun. 27, 2017, pertaining to PCT/EP2017/062673, filed May 24, 2017.
Belgian Search Report and Written Opinion, completed Oct. 24, 2016, pertaining to BE201605397, filed May 30, 2016.

*Primary Examiner* — Shawquia Jackson
(74) *Attorney, Agent, or Firm* — Dinsmore & Shohl LLP

(57) ABSTRACT

The present invention relates to the use of 9-tricosene as a pest control agent against *Drosophila suzukii*, where in 9-tricosene inhibits mating. The compound 9-tricosene can be used alone or mixed with other compounds in order to control *Drosophila suzukii* in a more efficient manner. In addition, this present invention provides the use of a dispenser and specific spraying methods with 9-tricosene.

7 Claims, 2 Drawing Sheets

USE OF 9-TRICOSENE TO CONTROL DROSOPHILA SUZUKII

FIELD OF THE INVENTION

The present invention relates to the use of 9-tricosene as a pest control agent against Drosophila suzukii, where in 9-tricosene inhibits mating. The compound 9-tricosene can be used alone or mixed with other compounds in order to control Drosophila suzukii in a more efficient manner. In addition, this present invention provides the use of a dispenser and specific spraying methods with 9-tricosene.

BACKGROUND TO THE INVENTION

Drosophila suzukii (Matsumura) (Insecta: Diptera: Drosophilidae), commonly named spotted wing Drosophila, is a highly invasive pest insect originating in South East Asia. This species is classified as a pest due to its rapid reproduction and ability to cause damage to ripening soft fruits such as cherries, blueberries and strawberries. Females are capable of cutting through the skin of soft fruit using a sharp ovipositor and subsequently lay eggs inside. This can cause crop losses up to 80%, leading to potential economical disasters.

Even though Drosophila suzukii has been reported throughout America and Western Europe since 2008, no clear species-specific integrated pest management (IPM) strategy has been described. Many potential IPM strategies such as attract-and-kill, mass trapping and mating disruption involve the usage of pheromones. However, relatively little is known about pheromones in D. suzukii and results obtained in the well-studied model organism Drosophila melanogaster are often different or even opposite to results obtained in D. suzukii. The most predominant pheromone amongst all Drosophila species is Cis-11-octadecenyl acetate (cVA), a short acting volatile sex pheromone. In Drosophila melanogaster cVA is produced by males and transferred to females during copulation. This causes the suppression of courtship by other Drosophila males. However it has been discovered that Drosophila suzukii does not actually produce cVA.

Thus, there is a continuing need to identify novel products, such as pheromones, for the pest control of Drosophila suzukii. As further detailed hereinafter, the mating-inhibiting effect of 9-tricosene an Drosophila suzukii has never been disclosed nor suggested in the art, rendering it as a useful compound with particular advantages over the present attractant of deterrent compounds for controlling this species.

SUMMARY OF THE INVENTION

It has surprisingly been found that 9-tricosene can be used as a pest control agent and inhibits D. suzukii mating. Therefore, in a first aspect, the present invention relates to the use of 9-tricosene as a pest control agent against Drosophila suzukii. The finding is especially surprising because it has recently been found that 9-tricosene exerts a very different function in D. melanogaster. Indeed, Drosophila melanogaster males deposit the pheromone 9-tricosene upon stimulation with the food-odor apple cider vinegar. This pheromone acts as a potent aggregation pheromone and as an oviposition guidance cue for females. It is also known that 9-tricosene serves as an aggregation pheromone and oviposition guidance for some other insects, such as ticks and flies. Or expressed differently, for Drosophila suzukii 9-tricosene acts completely opposite to how it is currently known in the art.

Furthermore, the compound 9-tricosene can be used alone or mixed with other compounds in order to control Drosophila suzukii in an even more efficient manner. In addition, this present invention provides the use of a dispenser and/or spraying methods with 9-tricosene, which are useful in controlling Drosophila suzukii in different crops and environments.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

The effect of 6 compounds on the occurrence of courtship behavior using 4-day-old wild type males is shown. (a) Shows the effect of 6 tested cuticular hydrocarbons (CHs) on the occurrence of courtship of 4 day old males with perfumed 1-day-old females. (b) Shows the effect of 6 tested CHs on the occurrence of courtship of 4 day old males with perfumed 1-day-old males. (c) Shows the effect of 6 tested CHs on the occurrence of courtship of 4 day old males with perfumed 4-day-old females. (d) Shows the effect of 6 tested CHs on the occurrence of courtship of 4 day old males with perfumed 4-day-old males.

Figure 2:
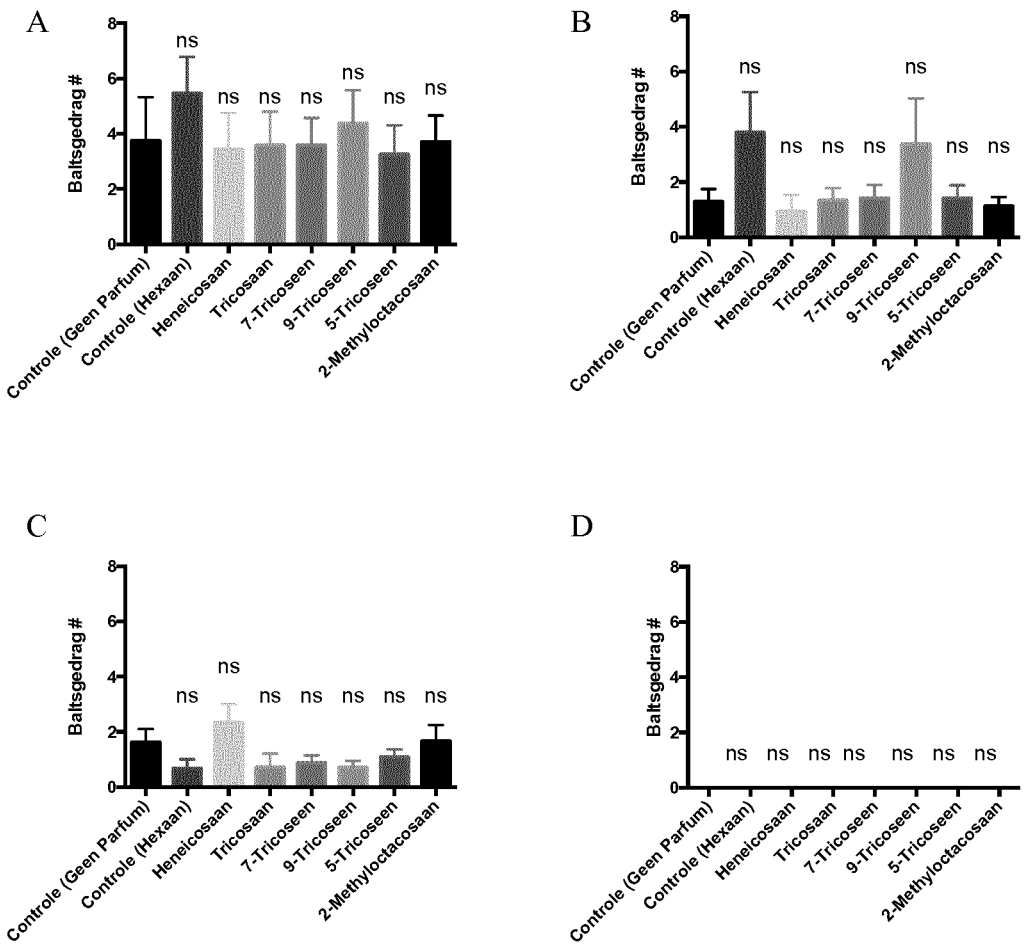

FIG. 2 The effect of 6 compounds on courtship behavior (#)—Courtship CHCs

In FIG. 2, the effect of 6 compounds on the average amount of courtship attempts using 4-day-old wild type males is shown. (a) Shows the effect of 6 tested CHs on the average number of courtship attempts of 4 day old males with perfumed 1-day-old females. (b) Shows the effect of 6 tested CHs on the average number of courtship attempts of 4 day old males with perfumed 1-day-old males. (c) Shows the effect of 6 tested CHs on the average number of courtship attempts of 4 day old males with perfumed 4-day-old females. (d) Shows the effect of 6 tested CHs on the average number of courtship attempts of 4 day old males with perfumed 4-day-old males.

Figure 3:
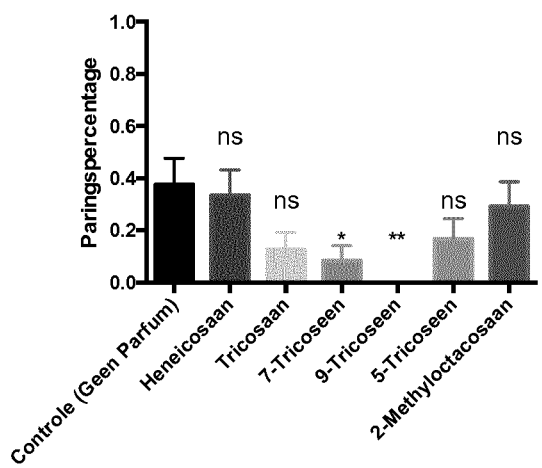

FIG. 3: The effect of 6 compounds on mating—Mating CHCs

In FIG. 3, the effect of 6 compounds on the occurrence of copulation between 4-day-old wild type males and perfumed 4-day-old females is shown.

DETAILED DESCRIPTION OF THE INVENTION

As described above, the present invention provides the use of 9-tricosene as a pest control agent against Drosophila suzukii. In a further embodiment, the invention provides the use of 9-tricosene to reduce reproduction, in particular through inhibiting mating, of D. suzukii. In a preferred embodiment, 9-tricosene as used herein refers to (Z)-9-tricosene, also known as cis-9-tricosene.

Furthermore, the present invention provides a composition comprising 9-tricosene that can be used to control *D. suzukii*. In a further embodiment, the composition further comprises one or more other pest control agents, such as insecticides, particularly other pest control agents against *D. suzukii*. This empowers a more efficient control of *Drosophila suzukii* in different crops by a different manner. Suitable other pest control agents to be used in a combination composition include, but are not limited to a) Insecticides (such as cyantraniliprole, spinosad, λ-cyhalothrin, acetamiprid) b) Attractants used for monitoring or mass trapping (for instance apple cider-vinegar mixtures) or c) Repellents. In a particular embodiment, the present invention provides a combination of 9-tricosene and 7-tricosene (particularly (Z)-7-tricosene), especially for the uses described herein.

The composition may include additional ingredients, such as one or more solvents and/or stabilizers. In a particular embodiment, the composition comprises an anhydrous solvent, particularly selected from the group consisting of hydrocarbons, alcohols, ketones, ethers and esters. In a particular embodiment, the solvent is selected from the group consisting of n-hexane, n-pentane, acetone and paraffin oil.

In a particular embodiment, the composition comprising 9-tricosene is used as a liquid formulation. In another embodiment, the invention provides a solid substrate impregnated with 9-tricosene for the uses described herein. In yet another embodiment, a dispenser comprising 9-tricosene is used. For example, 9-tricosene can be dispersed by using a dispenser which enables the spread of 9-tricosene on a continuous or a time-based manner, depending on the occurring pressure of *Drosophila suzukii* in a field or in a greenhouse. Alternatively, 9-tricosene is formulated in a way it can easily be applied using standard sprayings. Therefore, in a particular embodiment, the present invention provides a method to control *D. suzukii*, comprising spraying a formulation containing 9-tricosene on a crop or part of a crop. For example, a 9-tricosene formulation may be applied on fruit trees or plants to protect against *D. suzukii*. Alternatively, 9-tricosene may be applied directly on ripening or ripe fruits. Preferred application areas are agricultural fields and greenhouses, although the invention can also be applied beneficially in fruit storage locations.

EXAMPLES

Example 1

*Drosophila suzukii* adults were caught in the wild (Sint-Truiden, Limburg, Belgium). The flies were reared in quarantined facilities at 21° C. on Cornmeal-sucrose-yeast-agar medium.

All flies were collected within 12 hours of eclosing, after which they were used to make one-day-old samples or aged to four days old. The four-day-old socially nave flies were aged separated from the other sex, contrary to the socially experienced flies, which were aged, mixed with the other sex.

Example 2

N-hexane (95%), n-heneicosane (98%), n-tricosane (98%), (Z)-7-tricosene (98%) and (Z)-9-tricosene (97%) were bought from Thermo-Fischer and Sigma Aldrich. (Z)-5-tricosene (99%) and 2-methyloctacosane (95%) were synthesized by a hired company, Ecosynth (Gent, Belgium). These compounds were dissolved in n-hexane (95%) and painted onto the abdomen of *Drosophila suzukii* flies using number 2 paintbrushes. The four-day-old flies were perfumed 24 hours prior to testing, one-day-old flies 1 hour prior to testing.

Example 3

Behavior assays were performed in a room with regulated temperature (21° C.) and always at the same time (10 h30). The perfumed *Drosophila suzukii* flies were put individually with a wild type four-day-old *Drosophila suzukii* male in a circular arena (3 cm diameter). Every couple was filmed for two hours, due to the low activity rate of the species, using Sony Handycams CX240. Subsequently these videos were analyzed for courtship behavior and copulation based on Mazzoni et al. 2013 (Plos One 8(11): e80708). The behavioral data was analyzed using a contingency table and followed by t-tests, as well as one-way ANOVA tests for the continuous data.

Example 4

Behavior experiments were performed as follows. Four different conditions of flies were perfumed: one-day-old females, one-day-old males, four-day-old females and four-day-old males. These perfumed flies were paired with wild type four-day-old males. Subjects were scored for both courtship modules as well as copulation. As a control the solvent for the perfumes (n-hexane) was used. Both for courtship as well as mating behavior n-hexane showed no effect in any of the aforementioned conditions.

Figure 1:
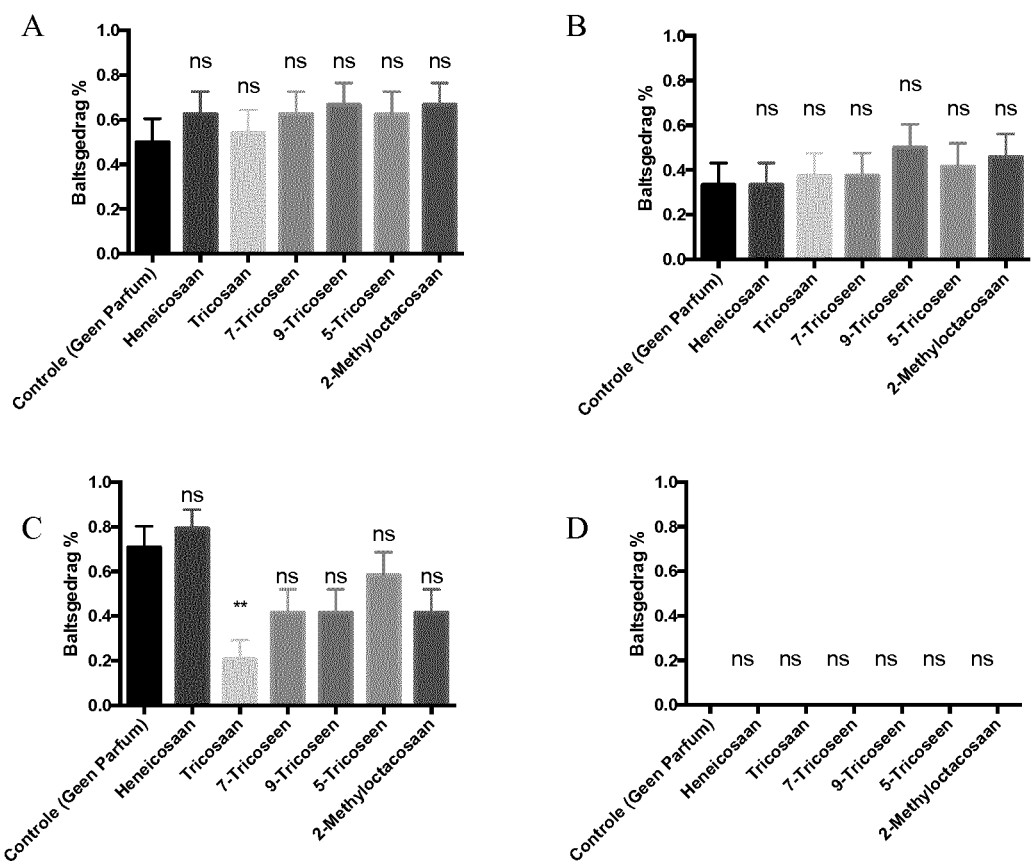
FIG. 1 The effect of 6 compounds on courtship behavior (%)—Courtship CHCs

Six different cuticular hydrocarbons were tested: n-heneicosane, n-tricosane, (Z)-5-tricosene, (Z)-7-tricosene, (Z)-9-tricosene and 2-methyloctacosane. When looking at the effect of these selected compounds on occurrence of courtship, no significant differences were found in any of the 4 tested conditions (FIG. 1). This means none of the compounds seems to influence whether or not courtship is initiated.

Even though the occurrence of courtship is not altered by any of the tested CHs, it is still possible that the amount of courtship is modified. However, analysis shows that the amount of courtship that takes place is not altered by any of the tested CHs in any of the four tested conditions (FIG. 2).

Furthermore, this does not exclude possible effects on the occurrence of copulation. Since copulation can only happen between fully mature males and females, perfumed four-day-old females were paired with wild type four-day-old males. Both 7-tricosene and 9-tricosene significantly decreased copulation (FIG. 3). Thus, 9-tricosene acts as a mating inhibitor and is useful for the control of *D. suzukii*.

The invention claimed is:

1. A method for controlling *Drosophila suzukii*, the method comprising:
   applying a formulation comprising 9-tricosene on a crop or part of a crop affected by *Drosophila suzukii*.

2. The method of claim 1, wherein the 9-tricosene inhibits mating of the *Drosophila suzukii*.

3. The method of claim 1, wherein the formulation further comprises one or more additional pest control agents that control *Drosophila suzukii*.

4. The method of claim 1, wherein the formulation further comprises 7-tricosene.

5. The method of claim 1, wherein the applying comprises spraying the formulation from a dispenser.

6. The method of claim 1, wherein the crop comprises ripening fruits or ripe fruits.

7. The method of claim 1, wherein the crop is on a fruit tree or a plant in an agricultural field, a greenhouse, or a fruit storage location.

\* \* \* \* \*